(12) United States Patent
McMillen et al.

(10) Patent No.: US 7,788,206 B2
(45) Date of Patent: Aug. 31, 2010

(54) STATE MACHINE COMPRESSION USING MULTI-CHARACTER STATE TRANSITION INSTRUCTIONS

(75) Inventors: Robert James McMillen, Carlsbad, CA (US); Michael D. Ruehle, Albuquerque, NM (US)

(73) Assignee: LSI Corporation, Milpitas, CA (US)

( * ) Notice: Subject to any disclaimer, the term of this patent is extended or adjusted under 35 U.S.C. 154(b) by 273 days.

(21) Appl. No.: 12/113,055

(22) Filed: Apr. 30, 2008

(65) Prior Publication Data

US 2008/0270764 A1 Oct. 30, 2008

Related U.S. Application Data

(60) Provisional application No. 60/915,013, filed on Apr. 30, 2007.

(51) Int. Cl.
*G06N 5/02* (2006.01)
(52) U.S. Cl. .............................. 706/48; 706/47; 706/46; 706/45; 706/50

(58) Field of Classification Search ................. 709/223, 709/247, 217; 718/104; 706/45, 46, 47, 706/48, 50
See application file for complete search history.

(56) References Cited

U.S. PATENT DOCUMENTS

| 2006/0085533 A1* | 4/2006 | Hussain et al. ............... 709/223 |
| 2006/0136570 A1* | 6/2006 | Pandya ........................ 709/217 |
| 2007/0050777 A1* | 3/2007 | Hutchinson et al. ......... 718/104 |

* cited by examiner

*Primary Examiner*—Le Luu

(57) ABSTRACT

Compressing state transition instructions may achieve a reduction in the binary instruction footprint of a state machine. In certain embodiments, the compressed state transition instructions are used by state machine engines that use one or more caches in order to increase the speed at which the state machine engine can execute a state machine. In addition to reducing the instruction footprint, the use of compressed state transition instructions as discussed herein may also increase the cache hit rate of a cache-based state machine engine, resulting in an increase in performance.

15 Claims, 9 Drawing Sheets

| Transition Instruction | State | Transition Character (or CCL) | Next State | Multi-Char | Preload |
|---|---|---|---|---|---|
| 1 | s1 | c | s2 | 1 | 0 |
| 2 | s1 | d | s18 | 1 | 0 |
| 3 | s1 | z | s31 | 1 | 0 |
| 4 | s2 | f | s3 | 1 | 0 |
| 5 | s3 | j,t,l | s6 | 3 | 3 |
| 6 | s6 | q,t,m | s9 | 3 | 0 |
| 7 | s9 | 1,a | s11 | 2 | 0 |
| ... | ... | ... | ... | ... | ... |
|  |  |  |  |  |  |

FIGURE 6

STATE MACHINE COMPRESSION USING MULTI-CHARACTER STATE TRANSITION INSTRUCTIONS

CROSS-REFERENCE TO RELATED APPLICATIONS

This application claims the benefit under 35 U.S.C. 119(e) of U.S. Provisional Application No. 60/915,013, filed on Apr. 30, 2007, which is incorporated herein by reference in its entirety. The subject matter of this application is related to U.S. patent application Ser. No. 12/113,083, filed on Apr. 30, 2008, entitled "SYSTEMS AND METHODS FOR REDUCING NETWORK PERFORMANCE DEGRADATION,", which is hereby incorporated by reference in its entirety.

BACKGROUND OF THE INVENTION

1. Field of Invention

This disclosure relates to compression and storage of state transition instructions of a state machine.

2. Description of Related Technology

Today's Internet is rife with security threats that take the form of viruses and denial-of-service attacks, for example. Furthermore, there is much unwanted incoming information sent in the form of spam and undesired outgoing information containing corporate secrets. These trends, and others, drive demand for more sophisticated processing at various points in the network, such as at server front ends, at wire speeds and near-wire speeds. These demands have given rise to anti-virus, intrusion detection and prevention, and content filtering technologies. At their core, these technologies depend on pattern matching. For example, anti-virus applications may look for fragments of executable code and Java and Visual Basic scripts that correspond uniquely to previously-captured viruses. Similarly, content filtering applications may look for a threshold number of words that match keywords on lists representative of the type of content (e.g., virus signature and/or SPAM) to be identified.

SUMMARY

In one embodiment, a method of evaluating a state machine with respect to a data string, wherein the state machine comprises a plurality of state transition instruction that are associated with transitions from respective states comprises storing at least some of the state transition instructions in a first memory, and determining if a state transition instruction associated with a currently active state of the state machine comprises a multi-character state transition instruction. In one embodiment, in response to determining that the state transition instruction associated with the currently active state comprises a multi-character state transition instruction, the method further comprises determining a quantity P of transition conditions indicated in the multi-character state transition instruction, where P is greater than or equal to 2, determining the transition conditions indicated in the multi-character state transition instruction, and determining if the next P characters of the data string match the P transition conditions indicated in the multi-character state transition instruction.

In one embodiment, an apparatus for evaluating a state machine with reference to a data string comprising a plurality of characters comprises a memory configured to store at least some of a plurality of state transition instructions associated with respective states of the state machine, an interface for receiving characters of the data string, and a processor for selectively accessing memory locations of the memory in response to respective characters of the data string, wherein the processor is further configured to determine if a particular state transition instruction stored in the memory comprises transition conditions associated with transitions between 2 or more sequential states of a linear path of the state machine.

In one embodiment, a method of generating a compressed state machine representative of a plurality of regular expressions that are associated with data strings comprises determining state transition instructions associated with respective states of the state machine, wherein at least some of the state transition instructions indicate at least one respective transition character and at least one next state transition instruction, wherein at least one of the state transition instructions indicates two or more sequential characters of an input data stream that must be received by the state machine engine in order to initiate transition to an indicated next state transition instruction.

BRIEF DESCRIPTION OF THE DRAWINGS

FIG. 6 is table illustrating certain attributes of state transition instructions corresponding to the state machine of FIG. 5.

DETAILED DESCRIPTION

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments. Furthermore, embodiments of the invention may include several novel features, no single one of which is solely responsible for its desirable attributes or which is essential to practicing the inventions herein described.

Contemporary pattern detection applications may use thousands to tens of thousands of regular expressions to detect character patters of interested, such as virus signatures or SPAM, for example. When compiled into state machines, the state transition instructions associated with these regular expressions consume a great deal of instruction memory. Accordingly, disclosed herein are systems and methods for compressing state transition instructions for storage in a memory. By compressing state transition instructions according to the systems and methods described herein, the binary instruction footprint of a state machine may be significantly reduced. In certain embodiment, the compressed state transition instructions are used by state machine engines that use one or more caches in order to increase the speed at which the state machine engine can execute a state machine. In addition to reducing the instruction footprint, the use of compressed state transition instructions as discussed herein may also increase the cache hit rate of a cache-based state machine engine.

Figure 1:
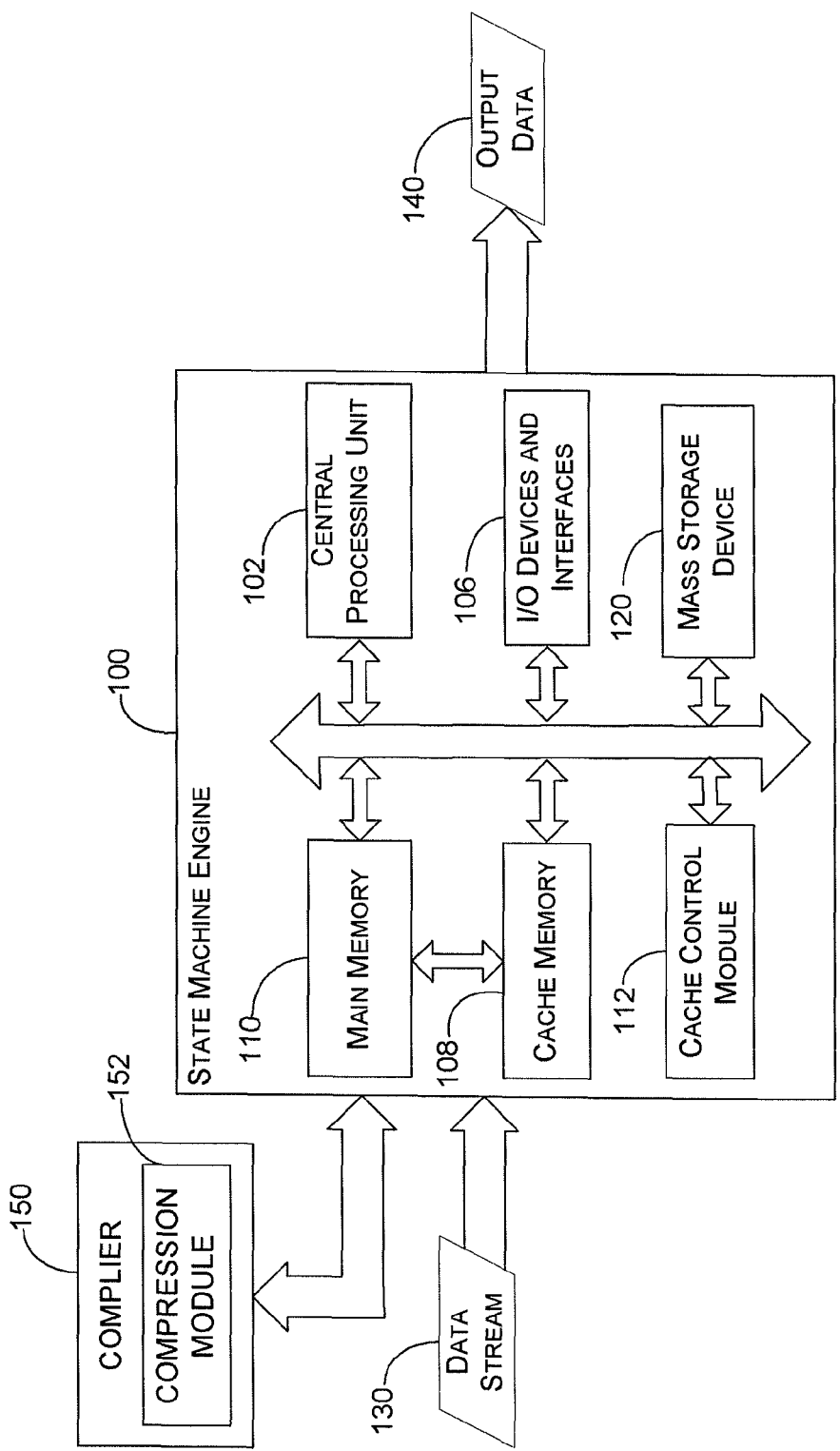
FIG. 1 is a functional block diagram of a system capable of implementing certain methods disclosed herein.

FIG. 1 is a block diagram of a compiler 150 in communication with a state machine engine 100. In one embodiment, the compiler 150 and the state machine engine 100 are in communication via one or more networks, such as one or more LANs, WANs, and/or the Internet, via wired and/or wireless communication links. In other embodiments, the compiler 150 and state machine engine 100 are not in direct communication, such as via an Internet connection, but instead information regarding state machines that is generated by the compiler 150 is provided to the state machine engine 100 via a storage medium such as a CD, DVD, or Blue-Ray disc, for example, or the state machine information is programmed into one or more memories, ASICs, multi-chip modules, FPGAs, and/or other reconfigurable logic devices that comprise at least a portion of the state machine engine.

Depending on the embodiment, the state machine engine may comprise a general purpose computing device, such as a personal computer or a network server, or a specialized computing device, such as a field programmable gate array (FPGA), an application specific integrated circuit (ASIC), or a multi-chip module. In one embodiment the state machine engine 100 comprises components of a network interface card (NIC) that are configured for interfacing with a network server. In another embodiment, the state machine engine 100 comprises a logic design that is used by one or more third parties in products designed, manufactured, and/or sold by the third party. For example, the state machine engine 100 may comprise a logic design that is included in an FPGA, ASIC, and/or system-on-chip (SOC) that is implemented by a third party, along with other logic of the third party. In other embodiments, components of the state machine engine 100 may be implemented on a personal computer or a dedicated processing unit for monitoring web traffic.

In the embodiment of FIG. 1, the state machine engine 100 comprises a central processing unit (CPU) 102, a cache memory 108, and a main memory 110, as well as I/O devices and interfaces 106 and a mass storage device 120. In other embodiments, the state machine engine 100 may comprise fewer components, such as only the compression module 112, main memory 110, cache memory 108, or any other combination of modules illustrated in FIG. 1. In one embodiment, the state machine engine 100 is configured to traverse a state machine that is stored in the main memory 110 and/or the cache memory 108 in response to characters in an input data stream 130, which may be received from a network (not shown), for example. The state machine engine 100 may be further configured to provide the output data 140 that is indicative of matches located in the processing of the input data stream 130. In one embodiment, the output data 140 is provided to one or more further processing modules, either external or internal to the state machine engine 100, that use the output data 140. In one embodiment, the state machine engine 100 locks certain commonly accessed states of a state machine in the cache memory 108 according to the systems and methods described in the commonly owned U.S. patent application Ser. No. 12/133,083, entitled "SYSTEMS AND METHODS FOR REDUCING NETWORK PERFORMANCE DEGRADATION," filed on Apr. 30, 2008, which is hereby incorporated by reference in its entirety.

In the embodiment of FIG. 1, a compiler 150 is depicted in communication with the state machine engine 100 (also referred to herein as the "system 100"). In one embodiment, the compiler 150 is configured to compile a plurality of regular expressions, or other strings that identify character patterns of interest, into a state machine, such as a DFA, for example, that is usable by the state machine engine 100 in evaluating the data stream 130. In the embodiment of FIG. 1, the compiler comprises a compression module 152 that is configured to reduce the memory requirements for storage of state transition instructions that are generated by the compiler. In one embodiment, the compiler comprises a software application that executes on a computing device, such as a general purpose computing device or a specialized computing device that is configured to perform compiling functions, wherein the compression module 152 comprises one or more software modules of the compiler software code. Alternatively, the compression module 152 may be a plug-in or add-in that interfaces with the compiler 150, or the compression module 152 may be implemented in hardware. In other embodiments, the compression module 152 may interface with the compiler 150 in other manners.

In general, the word "module," as used herein, refers to logic embodied in hardware or firmware, or to a collection of software instructions, possibly having entry and exit points, written in a programming language, such as, for example, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. Generally, the modules described herein refer to logical modules that may be combined with other modules or divided into sub-modules despite their physical organization or storage.

In one embodiment, the compiler 150 comprises a desktop, laptop, mobile, or other type of computer that is controlled and coordinated by server and/or desktop computer operating system software, such as the Windows 95, 98, NT, 2000, XP, Vista, Linux, SunOS, Solaris, PalmOS, Blackberry OS, or other compatible operating systems. In Macintosh systems, the operating system may be any available operating system, such as MAC OS X. In other embodiments, the compiler 150 may be controlled by a proprietary operating system. Conventional operating systems control and schedule computer processes for execution, perform memory management, provide file system, networking, and I/O services, and provide a user interface, such as a graphical user interface ("GUI"), among other things. In one embodiment, the compiler 150 executes compiler code, such as a software application for compiling regular expressions into a state machine, in order to generate a state machine for use by the state machine engine 100.

The exemplary system 100 includes one or more commonly available input/output (I/O) devices and interfaces 106, such as a keyboard, mouse, touchpad, and printer. In one embodiment, the I/O devices and interfaces 106 include one or more display device, such as a monitor, that allows the visual presentation of data to a user. More particularly, a display device provides for the presentation of GUIs, application software data, and multimedia presentations, for example. The system 100 may also include one or more multimedia devices, such as speakers, video cards, graphics accelerators, and microphones, for example. In other embodiments, the system does not include any I/O devices and interfaces 106 or may include only interfaces to receive the data stream 130 and/or to provide output data 140 to another computing system, for example. The compiler 150 may comprise any one or more of these same I/O devices and interfaces.

In the embodiment of FIG. 1, the system 100 may be in communication with a network (not shown), such as any combination of one or more LANs, WANs, or the Internet, for example, via a wired, wireless, or combination of wired and wireless, communication links. The network may communicate with various computing devices, such as the compiler 150, and/or other electronic devices via wired or wireless communication links. For example, the data stream 130 may be received from a network and may comprise data, such as web or email data, for example, transmitted between computing device across the Internet.

The central processing unit 102 may be any conventional general purpose single- or multi-chip microprocessor such as an Intel®, AMD®, or Motorola® microprocessor, for example. In addition, the central processing unit 102 may comprise any conventional special purpose microprocessor, such as an ASIC, FPGA, or a digital signal processor. In one embodiment, the cache control module 112 comprises the central processing unit 102, such as in an ASIC or a hardware logic device. In this embodiment, the cache control module 112 may be configured to evaluate the data stream 130 independent of any separate CPU.

In the embodiment of FIG. 1, the central processing unit 102 is coupled to both the cache 108 and the main memory 110, which are configured to store, among other things, state transition instructions for inspection of content over a network or other data stream. The cache 108 and/or main memory 110 may also be external devices or systems, for example, disk drives or tape drives. The cache 108 or main memory 110 may also be fast semiconductor storage (chips), for example, Random Access Memory (RAM), such as Static RAM or Dynamic RAM, which are connected to the central processing unit 102. In some embodiments, the cache 108 is configured to store less information than the main memory 110 and/or to be accessed faster than the main memory 110. In many cases, the cache is more expensive and thus smaller than the main memory 110.

In one embodiment, the system 100 is configured to minimize certain limitations of state machine engines, include cache based engines. In one embodiment, the compiler 150 and/or the compression module 152 generate state transition instructions that correspond with multiple transition characters, rather than having a separate state transition instruction for each transition character. It is always true for literal string signatures, and frequently true for regular expressions that, once a certain state is reached, typically deeper within the state machine, all subsequent transitions are of the single character type until a final state is reached. That is, matching continues if and only if one particular character is matched at each transition and fails otherwise. Thus, for such linear branches (also referred to herein as paths) of a DFA, an instruction that specifies a sequence of up to N characters (or character classes), where N could be 2, 3, 4, 5, 6, 7, 8, or more, depending on the available instruction width, can reduce the cache miss rate when matching linear paths of a state machine that correspond to strings associated with attack sequences, for example. Thus, the addition of a multi-character transition instruction may improve performance when there actually is a match to one of these attack sequences or when normal (non attack) data is similar to an existing pattern. Accordingly, in a cache based system, use of multi-character transition instructions can improve the cache hit rate of a state machine to about 70% or higher, such as 80%, 90%, or 95%, under a worst-case attack, for example. For example, in an embodiment having 6 characters and/or character classes (of 6 sequential states of a linear path) associated with each multi-character state transition instructions (also referred to herein as a compressed state transition instruction), a cache hit rate may increase by about 5%, 10%, 15%, or more. Such increases in cache hit rates may be sufficient to prevent the networking system from coming to a complete standstill while under attack. Additionally, in certain embodiments the use of multi-character transition instructions may reduce the compiled binary instruction 'footprint' of a state machine. For example, in an embodiment where 6 characters and/or character classes are associated with each multi-character state transition instruction, a compression ratio of the corresponding state machine may be on the order of around 10:1 or more.

Figure 2:
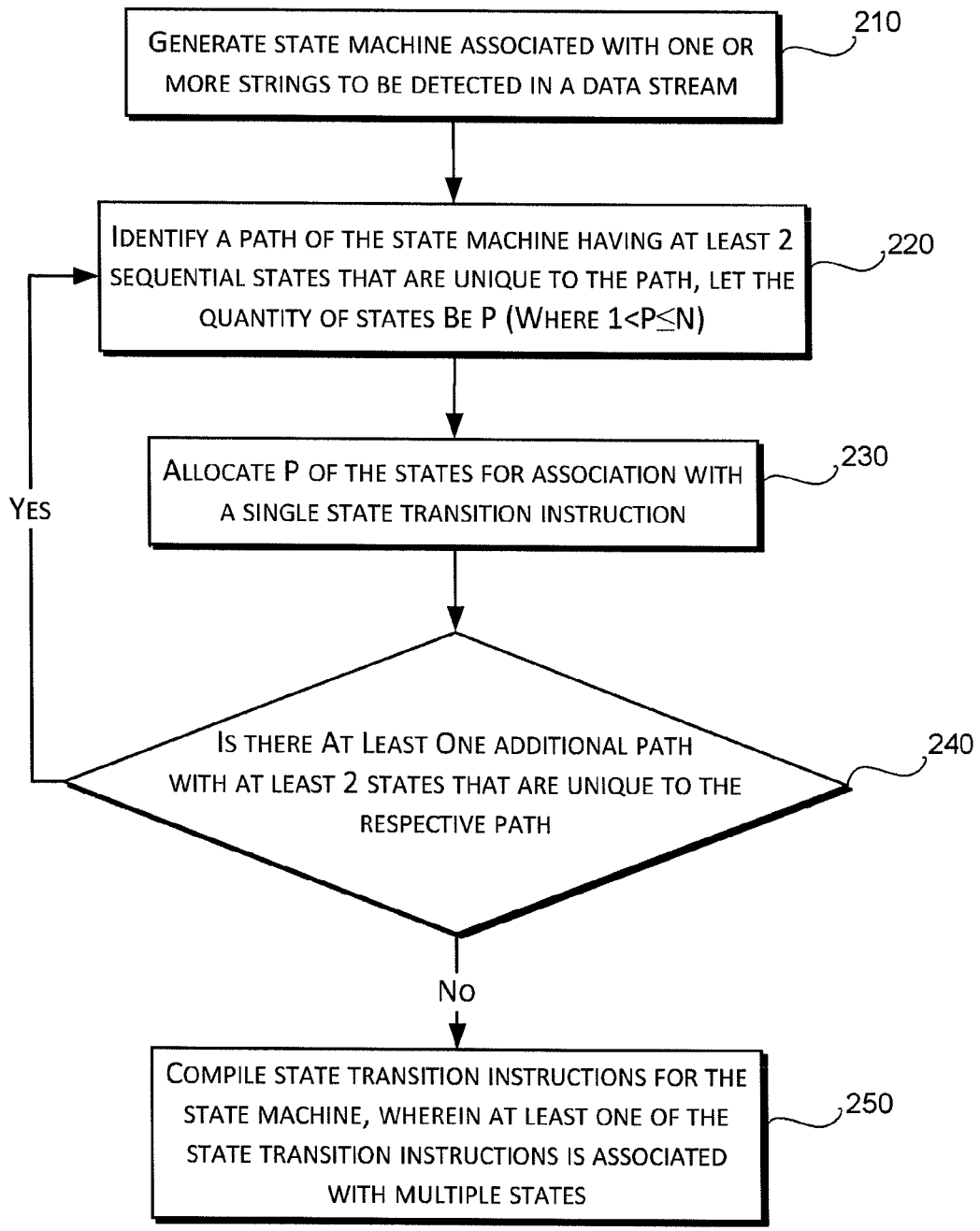
FIG. 2 is a flowchart illustrating one embodiment of a method of compressing state transition instructions associated with a state machine.

FIG. 2 is a flowchart illustrating one embodiment of a method of compressing state transition instructions associated with a state machine. The blocks of FIG. 2 may be executed by one or more computing devices, such as the compiler 150 of FIG. 1 and/or any other suitable computing device. Depending on the embodiment, the method of FIG. 2 may include fewer or additional blocks and the blocks may be performed in a different order than is illustrated.

Beginning in block 210, a state machine associated with one or more strings to be detected in an input data stream is generated. In one embodiment, the string of patterns to be detected in the data stream comprises one or more of virus definitions, SPAM-related patterns, and/or any other character strings that may need to be detected in an input data stream. In one embodiment, the compiler 150, along with the compression module 152 in certain embodiments, generates the state machine based on one or more regular expressions that are associated with the strings to be detected.

Moving to block 220, a path of the state machine having at least two sequential states that are unique to the path is identified. As noted above, literal strings typically have linear paths through much of the state machine, where a linear path is a series of sequential states that each have only one possible (non-failure) next state transition. Additionally, many paths of the state machine associated with regular expressions have linear portions. In many embodiments described herein, a variable P represents a quantity of states to be combined in a single state transition instruction and a variable N represents a maximum quantity of states that may be combined in a single state transition instruction, where the maximum may be determined based on a design choice of instruction size for the state transition instructions. In block 220, a path having at least two states that are unique to the single path is identified and P is set to the quantity of sequential states that are unique to the path, where P is no greater than N.

Next, in block 230 the P states are allocated for association with a single state transition instruction. For example, in one embodiment the transition characters associated with the P states are arranged for inclusion in any single state transition instruction, which is referred to herein as a multi-character instruction. In one embodiment, a next state associated with the single state transition instruction is a next state associated with the last of the states that are combined into the single multi-character state transition instruction. In another embodiment, which is discussed in further detail below with reference to FIG. 4, multi-character instructions that represent a linear path may be configured for sequential storage in a memory of a state machine engine, along with an indication of a quantity of states associated with the same path. In that embodiment, a next state may be included only in a last of the multi-character instructions associated with the single path.

Continuing to block 240, the compiler 150 and/or a compression module 152 determines if there is at least one additional path with at least two states that are unique to the respective path. Thus, at decision block 240, the compiler attempts to locate additional linear paths of the state machine for compression. If the compiler located additional linear paths that have not yet been compressed, the method returns to block 220 where the states are allocated for compression. Alternatively, if the compiler does not locate any linear paths that have not already been compressed, the method continues to block 250, where the state transition instructions, including the multi-character instructions, are compiled for transmission and/or execution by a state machine engine. As noted above with reference to block 230, certain of the state transition instructions are multi-character transition instructions that are each associated with multiple states of the state machine. Thus, these multi-character ("compressed") state transition instructions reduce the size of the state machine when compared to a state machine having at least one separate state transition instruction for each state, including each state representative of characters of a linear path.

Figure 3:
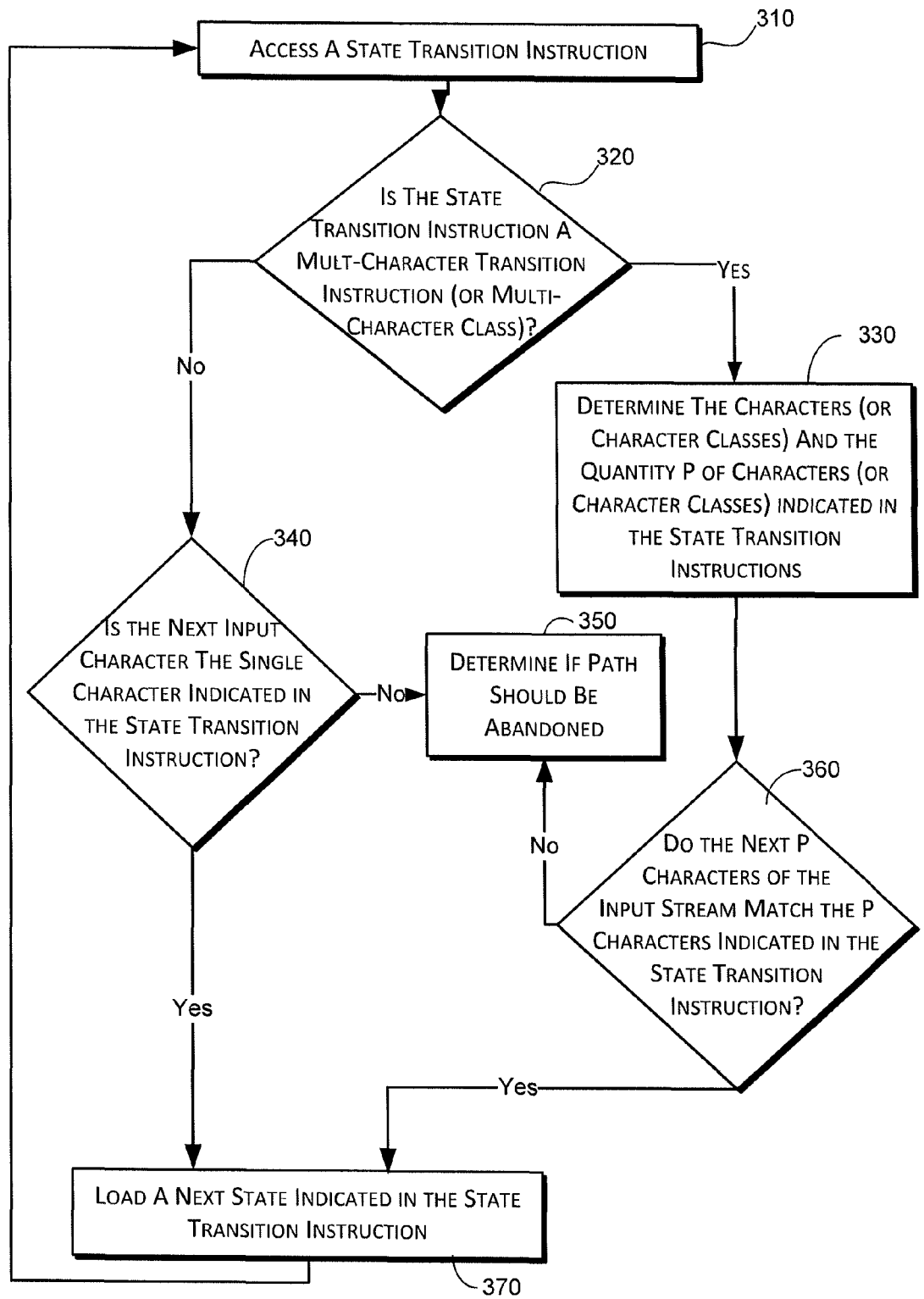
FIG. 3 is a flowchart illustrating one embodiment of a method of evaluating a state machine comprising one or more compressed state transition instructions.

FIG. 3 is a flowchart illustrating one embodiment of a method of evaluating a state machine comprising one or more compressed state transition instructions. In one embodiment, the method of FIG. 3 may be executed by a state machine engine, such as the state machine engine 100 of FIG. 1. In certain embodiments, the state machine engine 100 may be embodied in one or more hardware devices, such as an ASIC, FPGA, and/or other reconfigurable logic device, for example. In one embodiment, the functionality of the state machine engine 100 may be implemented in a network interface card that interfaces with a network server, for example, in order to analyze data flowing through the network server. Depending on the embodiment, the method of FIG. 3 may include additional or fewer blocks and the blocks may be arranged in a different order than is illustrated.

Beginning in block 310, the state machine engine 100 accesses a state transition instruction, such as a state transition instruction associated with a start state or with a next state indicated by a previously matched state. In a cache-based system, the state transition instruction may already be cached in the cache memory. Alternatively, the state transition instruction may be accessed in a main memory, such as main memory 110 of the state machine engine 100.

Moving to block 320, the state machine engine determines if the state transition instruction is a multi-character instruction. As described above with reference to FIG. 2, for example, a multi-character transition instruction includes transition conditions for multiple sequential states of a linear state machine path. Although the examples provided herein refer to compression of states that are unique to a single path of a state machine, other embodiments may compress states of a state machine that are common to two or more paths of the state machine. Additionally, in certain embodiments the transition condition for certain compressed states may comprise one or more character classes, rather than simply single characters. As described in more detail in co-pending application Ser. No. 10/851,482, filed on May 21, 2004 and entitled "REGULAR EXPRESSION ACCELERATION ENGINE AND PROCESSING MODE," which is hereby incorporated by reference in its entirety, character classes associated with multiple characters may be used to reduce the memory requirements for storage of a state machine.

If the current state transition instruction is a multi-character instruction, the method continues to block 330 where the multiple characters indicated in the compressed transition instruction are identified. Alternatively, if the current state transition instruction is not a multi-character instruction, the method continues to block 340 where the next character in the input data stream is compared to the single character indicated in the state transition instruction. If the transition character of the transition instruction matches the current character of the data stream, the method continues to block 350 where a next state of the state machine is loaded based on a next state indicated in the current state transition instruction. Alternatively, if the current state transition in the input data stream does not match the transition character, the method continues to block 370 where the state machine engine determines if the current path should be abandoned or if another action should be taken. For example, in one embodiment state transition instructions include failure transitions that indicate a next state and/or action to be taken if the transition condition for the state is not met. One failure transition is to return to the start state and continue searching for matches within the input data stream.

Returning to block 330, which is reached if the state machine engine determines that the state transition instruction is a multi-character transition in block 320, the state machine engine determines the characters, or character classes in certain embodiments, and the quantity of characters that are included in the current multi-character transition instruction. As noted above, a multi-character transition instruction includes an indication of multiple characters associated with sequential states of a linear state machine path. Thus, in block 330, the state machine engine determines how many characters, and associated states of the state machine, are represented by the current multi-character transition instruction. In this embodiment, the quantity P represents the quantity of characters associated with the current multi-character transition instruction.

Moving to block 360, the state machine engine determines if the next P characters of the input data stream match the P characters of the multi-character transition instruction. Depending on the embodiment, the quantity P may be as little as two and as high as is suitable given memory constraints of the compiler that generates the state machine and/or the state machine engine that executes the state machine. For example, the quantity may be as high as 4, 6, 7, 8, 10, 12, 24, 36, or higher. In block 360, if the state machine engine determines that the next P characters of the input stream matched the P characters indicated in the multi-character transition instruction, the method continues to block 370 where a next state transition instruction indicated in the multi-character transition instruction is loaded for analysis by the state machine engine. In one embodiment, such as when multiple multi-character state transition instructions are located sequentially in memory, the next state may simply be the next multi-character transition instruction in a cache memory. In this embodiment, the size of the multi-character transition instructions may further be reduced by not requiring next state information, such as a base address of the state transition instructions associated with the desired next state.

Figure 4:
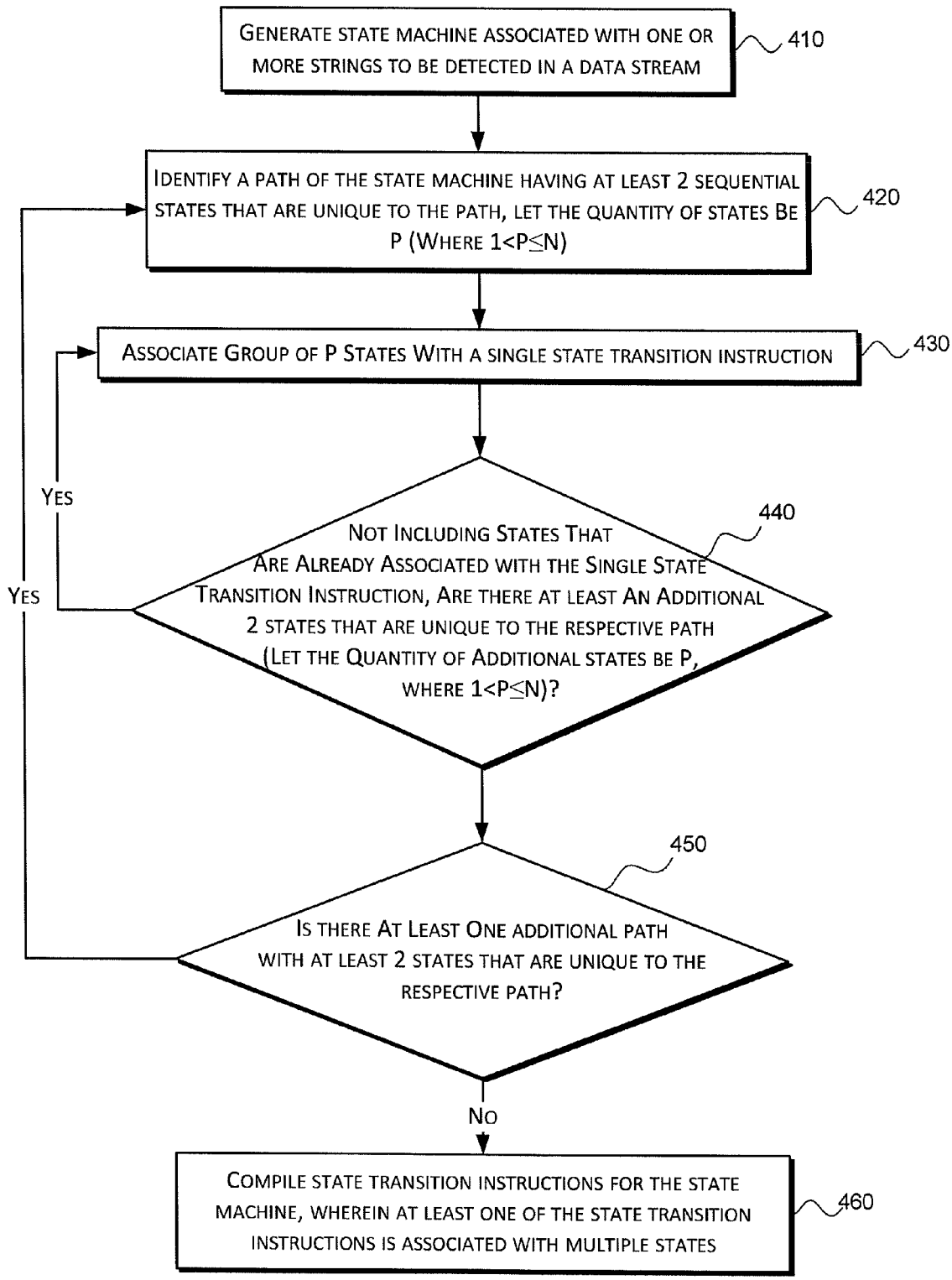
FIG. 4 is a flowchart illustrating another embodiment of a method of compressing state transition instructions associated with a state machine.

FIG. 4 is a flowchart illustrating another embodiment of a method of compressing state transition instructions associated with a state machine. Certain steps of the method of FIG. 4 are similar to those in the flowchart of FIG. 2. However, the method of FIG. 4 includes steps that locate multiple blocks of sequential states of a linear path and generates multiple multi-character instructions for that linear path. In one embodiment, the compiler 150, along with the compression module 152 in certain embodiments, executes the blocks of FIG. 4. Depending on the embodiment, the method of FIG. 4 may include fewer or additional blocks and the blocks may be performed in a different order than is illustrated.

Blocks 410 and 420 of FIG. 4 are identical to blocks 210 and 220 of FIG. 2, respectively. In general, in block 410 the compiler generates a state machine associated with one or more strings to be detected in a data stream and in block 420 a path of the state machine having at least two sequential states that are unique to the path is identified. In this embodiment, the variable P represents a quantity of states to be combined in a single multi-character transition instruction and the variable N represents a maximum quantity of states that may be combined in a single multi-character transition instruction, where the maximum may be determined based on a design choice of instruction size for the state transition instructions. Because P can only be as large N, if the quantity of sequential states that are unique to the identified path is greater than P, then P equals N.

Moving to block 430, a group of P states of the identified path are associated with a single state transition instruction. For example, the first time block 430 is executed for an identified path, the first P states of the linear path may be associated with a first multi-character state transition instruction. If additional groups of states our also available for combination in multi-character transition instructions (see discussion below regarding blocks 440 and 450), states that are further down the identified path are associated with subsequent multi-character transition instruction.

Next, in block 440, the compiler determines if there are at least an additional two states that are unique to the identified path, not including states that are already associated with a multi-character transition instruction in block 430. If there are additional states of the identified path, the method returns to block 430 where the identified group of P states is associated with another multi-character transition instruction. The loop between blocks 430 and 440 may be repeated an indefinite number of times in order to group states of an identified path into multiple multi-character state transition instructions.

If there are no additional states for grouping into multi-character transition instructions in block 440 the method continues to decision block 450 where the compiler determines if there are additional paths with at least two states that are unique to the path. Thus, decision block 450 allows multiple paths to be compressed by combining states of respective paths into one or more multi-character transition instructions. If additional paths are candidates for compression in this manner, the method returns to block 420. If there are no remaining paths having at least two states that are unique to the respective path, the method continues to block 460 where the state transition instructions, including one or more multi-character state transition instructions, are compiled for transmission/execution by a state machine engine.

Figure 5:
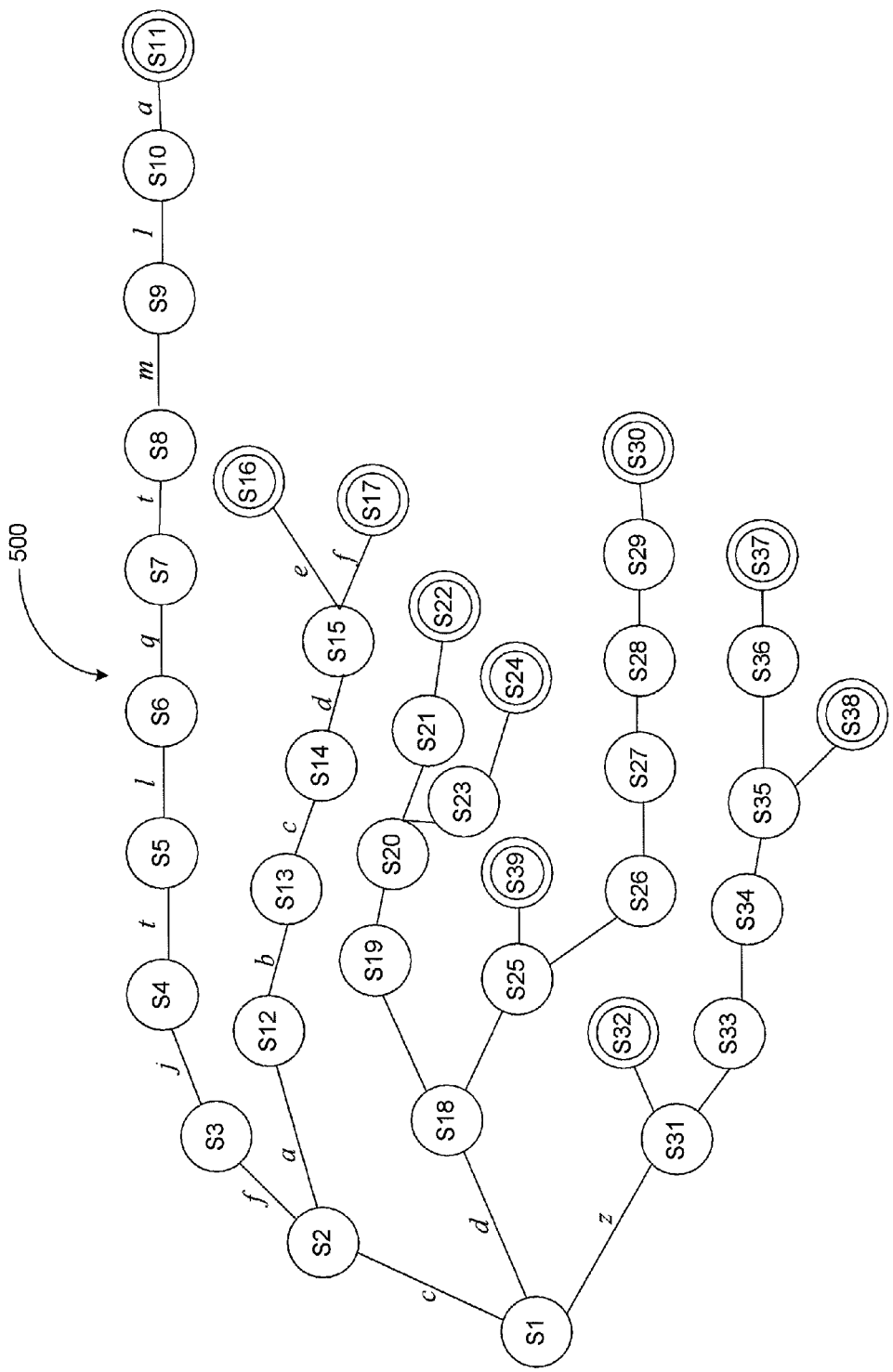
FIG. 5 illustrates an exemplary state machine having a plurality of states.

FIG. 5 illustrates an exemplary state machine 500 having a plurality of states. The sample state machine 500 includes only a small quantity of states as compared to the thousands or millions of states that may be necessary in network applications. In the embodiment of FIG. 5, the start state S1 has three possible next states, specifically, states S2, S18, and S31. In this embodiment, the transition character for state S2 is "c". Thus, if S1 is active and the character "c" is received in the data stream, the state machine transitions to state S2, which has only a single possible next state of state S3. As shown in the state machine 500, the state machine engine would activate state S3 if the character "f" is received in the data stream while state S2 is active.

In the sample state machine 500, state S3 has two possible next states, namely, states S4 and S12. With state S3 active, if the character "j" is received in the input data stream, the state machine engine activates state S4 and begins down a linear path of the state machine that continues until terminal states S11. Thus, once state S4 is active, the state machine will either fail or succeed in locating a match based on the states and associated transition conditions of the single path from state S4 to state S11. Using the methods described in FIG. 2 and/or FIG. 4, for example, a compiler may combine certain state transition instructions (e.g., transition characters and/or character classes associated) associated with states of linear paths in order to reduce the memory footprint required for the state machine 500. The state machine 500 is referred to in the discussion of FIGS. 6-8 for purposes of illustration, and is not intended to limit the scope of the systems and methods described herein.

FIG. 6 is table 600 illustrating certain attributes of state transition instructions corresponding to the state machine of FIG. 5. Table 600 is not intended to illustrate all fields of a state transition instruction or even the actual data that represents the indicated possible fields of a state transition instruction. Rather, table 600 provides a conceptual overview of the types of information that may be contained in state transition instructions, including multi-character state transition instructions. Exemplary table 600 comprises a transition instruction column 610 that provides a count of the transition instructions, a state column 620 that indicates a state associated with the respective transition instruction, a transition condition column 630 that indicates a transition character and/or character class that is required before a next state and/or actions associated with the respective state is taken, and a next state column 640 that indicates a next state that is to be activated upon matching of the respective transition condition in column 630. In the embodiment of FIG. 6, the table 600 further includes a multi-character column 650 that indicates a quantity of transition characters that are included in the respective state transition instruction. In one embodiment, if the multi-character indicator in column 650 is two or more, the transition instruction is considered a multi-character transition instruction. The table 600 further includes a preload column 660 that may contain information allowing a cache-based state machine engine to preload a series of multi-character instructions that are each associated with a same linear path of a state machine.

The table 600 includes information associated with three multi-character state transition instructions in rows 670, 672, and 674. In this embodiment, N is set to three, such that a multi-character transition instruction may include transition conditions for no more than three states. In other embodiments, N may be any other quantity, such as 4, 5, 6, 7, 8, 9, 10, 12, 24, 32, 64, or higher. In the embodiment of FIG. 6, row 670 includes data regarding a transition from state S3 (see column 620). For the multi-character transition instruction of row 670, three transition characters are indicated, namely "j", "t", and "l". Referring to FIG. 5, it is seen that the transition character from state S3 to state S4 is "j", the transition character from state S4 to state S5 is "t", and the transition character from state S5 to state S6 is "l". Thus, the three transition characters for these transitions having combined in the table of FIG. 6 in a single multi-character transition instruction that begins with a transition from state S3. Because three transition conditions are combined into this single multi-character transition instruction, the next state column 640 is set to state S6. Accordingly, if the three transition characters "j", "t", and "l" are located in the input data stream when state S3 is active, the state machine engine then moves to the state transition instruction for state S6. In the multi-character column 650, the table 600 indicates that the multi-character state transition instruction in row 670 includes three transition characters and/or character classes. Finally, in column 660, the table 600 indicates a preload value of three for the multi-character transition instruction in row 670, which indicates that the three state transition instructions that immediately follow the current state are part of the same linear path as the current multi-character transition instruction and, thus, may be preloaded into a cache memory in certain embodiment. Preloading of multi-character instructions may allow faster execution of the state machine and/or improvement in the cache hit rate of a cache-based state machine engine. Thus, a state machine engine that has traversed the state machine 500 to state S3 may preload state transition instructions 6 (row 672), 7 (row 674), and 8 (not shown), where the state transition instruction 8 may include an instruction that indicates action and/or tokens to execute in response to matching the series of multi-character transition conditions.

Figure 7:
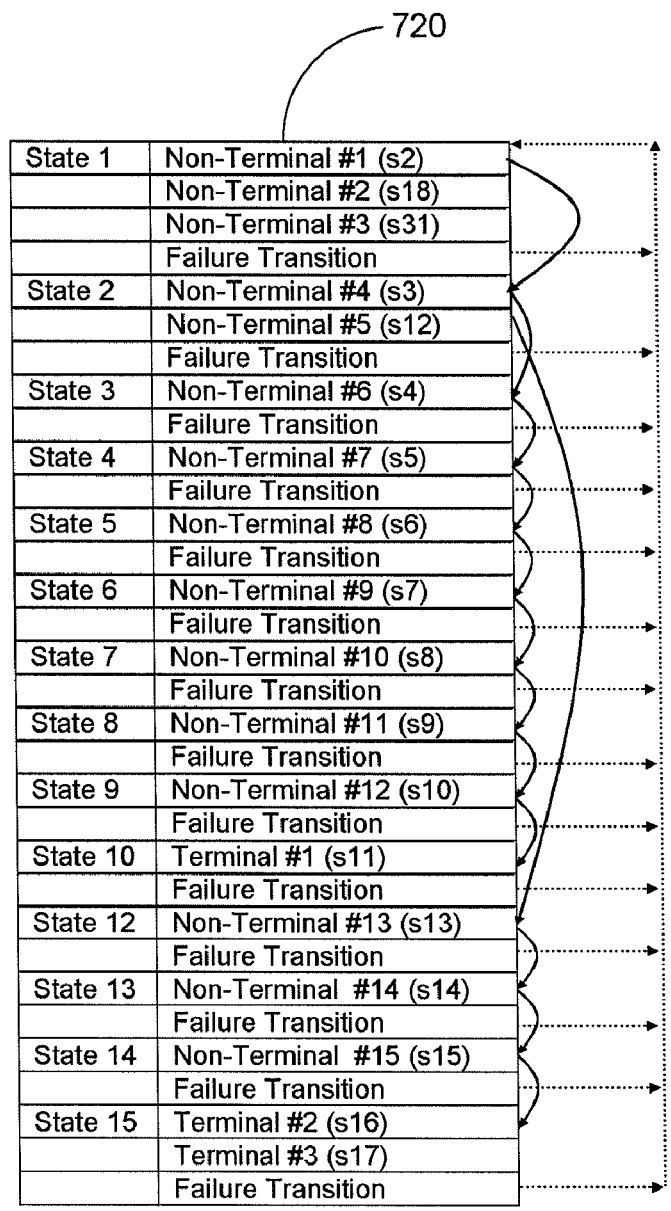
FIG. 7 is a table illustrating an exemplary memory allocation of certain states of the state machine of FIG. 5 without multi-character compression.

FIG. 7 is a table illustrating an exemplary memory allocation of certain states of the state machine of FIG. 5 without multi-character compression. As illustrated in FIG. 7, each of these states comprises at least two instruction words in the table of FIG. 7, including one or more instructions associated with transitions to next states (e.g., non-terminal states) and/or instructions for an action and/or token (e.g., terminal states), as well as a failure transition that indicates a next state that should be activated in response to not matching transition conditions of the respective states. Thus, with reference to State 1, there are four transition instructions, one for each of the transitions to non-terminal states of the state machine and one for the failure transition that is executed if none of the transition conditions for the non-terminal states are matched. As noted in the transition instruction column 720 of FIG. 7, the first transition instruction is to non-terminal state S2, which occurs if the current character in the input data string is "c" (see FIG. 5), the second transition instruction is to non-terminal state S18, which occurs if the current character in the input data string is "d" (see FIG. 5), and the third transition instruction is to non-terminal state S31, which occurs if the current character in the input data string is "z" (see FIG. 5). As shown in FIG. 7, each of the states S4 to S10 comprises two transitions slots in the memory structure, one for a transition instruction to a next state and one for a failure transition. Accordingly, for these seven transitions, 14 memory slots of the state machine main memory and/or cache memory are required.

Figure 8:
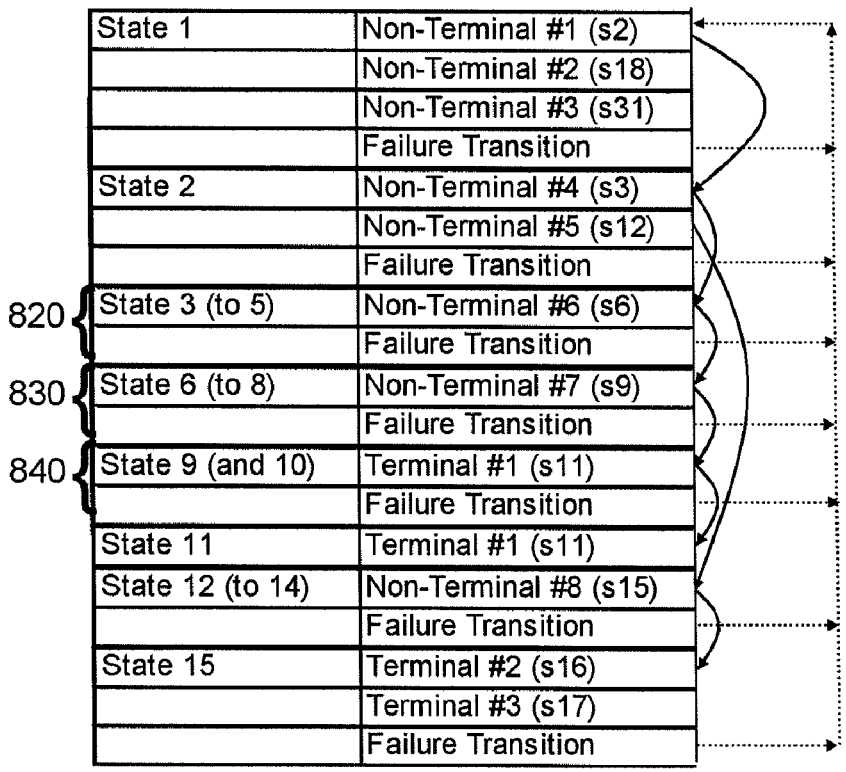
FIG. 8 is a table illustrating an exemplary memory allocation of certain states of the state machine of FIG. 5 with multi-character compression.

FIG. 8 is a table illustrating an exemplary memory allocation of certain states of the state machine of FIG. 5 with multi-character compression. The memory layout of FIG. 8 illustrates the reduction of memory requirements for a state machine compressed to include multi-character state transition instructions. In this embodiment, the memory layout for states 1 and 2 are the same as for the memory allocation of FIG. 7. However, for states 3-11, which are each states that are unique to a single path of the state machine 500 and, therefore, qualify for compression into multi-character transition instructions (see, for example, FIGS. 2-4), the number of transition instructions required for these states is reduced through the use of multi-character state transition instructions. In particular, the transition conditions of states 3 to 5 having combined into a pair of transition instructions 820 comprising a non-terminal transition to state S6 (in the event that the characters "j", "t", and "l" are matched in the input data stream) and a single failure transition. The transition instructions for states 6-8 and states 9-10 have similarly been combined into pairs of transition instructions 830, 840, respectively. Thus, states 1-13 of the state machine 500 as stored in a memory using multi-character transition instructions comprises 16 transition instructions, while the same 13 states comprise 28 transition instructions in the uncompressed format illustrated in FIG. 7, for a compression ratio of 1.75:1.

Figure 9:
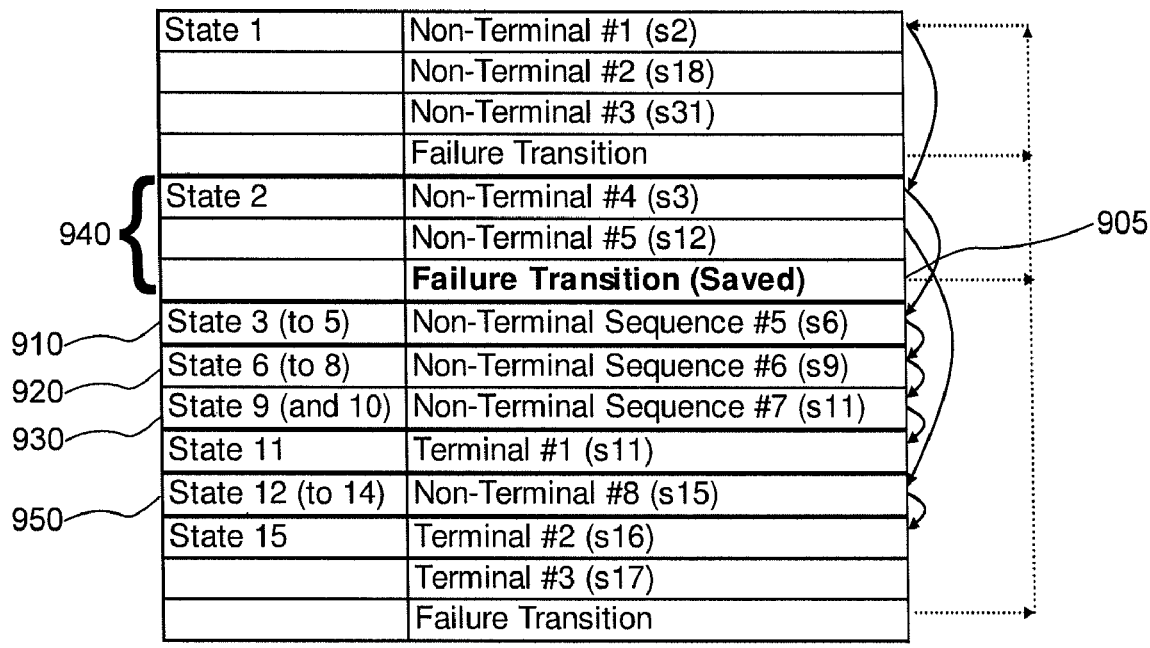
FIG. 9 is a table illustrating another exemplary memory allocation of certain states of the state machine of FIG. 5 with multi-character compression.

FIG. 9 is a table illustrating another exemplary memory allocation of certain states of the state machine of FIG. 5 with multi-character compression. Similar to FIG. 8, state 1 of FIG. 9 is a three-char instruction that includes three non-terminal transitions, along with a failure transition. However, the memory allocation illustrated in FIG. 9 further reduces the memory requirements for the multi-character transitions instructions by including only a single failure transition for a series of three multi-character transition instructions. In the particular example of FIG. 9, the failure transition for the three multi-character transition instructions 910, 920, 930 is located at a fixed offset in the instruction block executed immediately before the first of the multi-character transition instructions in the series (instruction 910) as a failure transition 905 that is part of the transition instruction 940 for state 2. In this embodiment, the failure transition 905 for state 2 is stored by the state machine engine and shared with the multi-character transition instructions 910, 920, and 930. By storing the failure transition 905 and associating it with each of multiple multi-character transition instructions, the individual multi-character transition instructions 910, 920, 930 are not required to each include a failure transition. Furthermore, because the failure transition is in a known location, if the character or character class associated with one of the multi-character transition instructions 910, 920, 930 fails to match, the saved failure instruction is executed.

In one embodiment, a failure instruction may be used for multi-character transitions that are not directly following the failure instruction. For example, a failure transition may be stored for use by any of two or more multi-character transition instructions associated with the next states of a two-char transition instruction, regardless of the location of the multi-character instructions in the memory. In the embodiment of FIG. 9, transition instruction 940 represents a two-char instruction, where a transition is possible to either the transition instruction of state S3 or state S12. In this embodiment, the failure transition 905 for state 2 is shared by the multi-character transition instruction 950 for state 12, as well as for multi-character transition instructions 910, 920, 930.

In the embodiment of FIG. 9, because the multi-character instructions 910, 920, 930 are stored in sequential memory slots, the instructions do not need to include next state addresses. Rather, if the transition condition of one of these instructions is matched, the state machine knows that the next state is the next memory address. Removal of the need for a next state transition in a multi-character transition instruction frees additional memory for other purposes, such as for storage of additional transition conditions for a linear path of the state machine. For example, a 32 bit next state address may be replaced by 4 more 8-bit characters or character classes. In one embodiment, the memory saved by not requiring a next state address may be occupied with any other relevant data.

In one embodiment, multi-character instructions can only follow a 1-char or 2-char instruction block. In such an embodiment, when a 1-char sequence transitions out of an Equivalence Class, a 1-char instruction for the first character out may be followed by the multi-char instruction or instructions in order to satisfy the requirement. In other embodiments, multi-char instructions may follow any other types of instructions.

In comparing the memory requirement of FIGS. 7, 8, and 9, the number of instructions needed for storage of state transition instructions for the same 15 states is 32 instruction for the uncompressed format of FIG. 7, 19 instructions for the compressed format of FIG. 8, and 15 instructions for the compressed format of FIG. 9, resulting in a compression ratios for FIGS. 8 and 9 of 1.7:1 and 2.1:1, respectively, when compared to the uncompressed format of FIG. 7. The compression ratio may be further increased with the combination of more state transition instructions into a single multi-character transition instructions and/or when applied to longer linear paths of a state machine.

The above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A method of evaluating a state machine with respect to a data string, wherein the state machine comprises a plurality of state transition instructions that are associated with transitions from respective states, the method comprising:
   storing at least some of the state transition instructions in a first memory;
   determining if a state transition instruction associated with a currently active state of the state machine comprises a multi-character state transition instruction;
   in response to determining that the state transition instruction associated with the currently active state comprises a multi-character state transition instruction,
      determining a quantity P of transition conditions indicated in the multi-character state transition instruction, where P is greater than or equal to 2;
      determining the transition conditions indicated in the multi-character state transition instruction; and
      determining if the next P characters of the data string match the P transition conditions indicated in the multi-character state transition instruction;
   otherwise,
      determining if the next one character of the data string matches a single transition condition indicated in the state transition instruction.

2. The method of claim 1, wherein the transition conditions each comprise an indication of a character and a character class.

3. The method of claim 1, wherein the data string comprises data transmitted across at least the Internet and received at a network node.

4. The method of claim 1, wherein the state machine is configured to match one or more anti-virus signatures.

5. An apparatus for evaluating a state machine with reference to a data string comprising a plurality of characters, the apparatus comprising:
   a memory configured to store at least some of a plurality of state transition instructions associated with respective states of the state machine;
   an interface for receiving characters of the data string; and
   a processor for 1) selectively accessing memory locations of the memory in response to respective characters of the data string and 2) determining if a state transition instruction associated with a currently active state of the state machine comprises a multi-character state transition instruction,
   wherein if the state transition instruction associated with the currently active state comprises a multi-character state transition instruction, the processor is configured to i) determine a quantity P of transition conditions indicated in the multi-character state transition instruction, where P is greater than or equal to 2, ii) determine the transition conditions indicated in the multi-character state transition instruction, and iii) determine if the next P characters of the data string match the P transition conditions indicated in the multi-character state transition instruction;
   otherwise, the processor is configured to determine if the next one character of the data string matches a single transition condition indicated in the state transition instruction.

6. The apparatus of claim 5, wherein the transition conditions each comprise an indication of a character and a character class.

7. The apparatus of claim 5, wherein the apparatus comprises one or more of a network interface card, an application specific integrated circuit, a field programmable gate array, a multi-chip module, and a reconfigurable logic circuit.

8. The apparatus of claim 5, wherein the apparatus is configured to interface with a network server.

9. A non-transitory machine-readable storage medium, having encoded thereon program code, wherein, when the program code is executed by a machine, the machine implements a method of generating a compressed state machine representative of a plurality of regular expressions that are associated with data strings, the method comprising:
   determining state transition instructions associated with respective states of the state machine, wherein at least some of the state transition instructions indicate at least one respective transition character and at least one next state transition instruction,
   wherein at least one of the state transition instructions indicates two or more sequential characters of an input data stream that must be received by the state machine engine in order to initiate a transition to an indicated next state transition instruction,
   wherein a first state transition instruction indicates a first quantity of characters of the data string that must be received by the state machine engine to transition to a second of the state transition instructions and the second state transition instruction indicates a second quantity of characters of the data string that must be received by the state machine engine to transition to a third of the state transition instructions, and
   wherein the first quantity is equal to a maximum quantity of characters associated with respective state transition instructions and the second quantity is less than or equal to the maximum quantity, the maximum quantity selected from the group comprising 2, 3, 4, 5, 6, 7, 8, 10, 16, 24, 32, 64, and 128.

10. The method of claim 9, wherein the two or more sequential characters comprise characters of at least one of the data strings.

11. The method of claim 9, wherein the first state transition instruction is configured to indicate a quantity of state transition instructions for pre-fetching in the cache memory in response to activation of the first state transition instruction by the state machine engine.

12. The method of claim 9, wherein the first state transition instruction indicates a quantity of state instructions associated with states following the first state transition instruction that each indicate two or more sequential characters of the input data stream that must be received by the state machine engine in order to initiate transitions to respectively indicated next states.

13. The method of claim 12, further comprising prefetching from a first memory at least some of the quantity of state transition instructions.

14. The method of claim 9, further comprising:
determining one or more instructions of the state machine for caching in a cache memory of a state machine engine, wherein the state machine engine comprises the cache memory and at least one main memory, wherein access times of the cache memory are lower than access times of the at least one main memory.

15. The method of claim 9, wherein each of the two or more sequential characters comprise an indication of a character and a character class.

* * * * *